(12) United States Patent
DeGregorio

(10) Patent No.: US 6,789,925 B1
(45) Date of Patent: Sep. 14, 2004

(54) LIGHTING APPARATUS FOR BICYCLES

(76) Inventor: Kevin DeGregorio, 155 S. Burlington St. #B, Gloucester, NJ (US) 08030

( * ) Notice: Subject to any disclaimer, the term of this patent is extended or adjusted under 35 U.S.C. 154(b) by 16 days.

(21) Appl. No.: 10/093,164

(22) Filed: Mar. 5, 2002

Related U.S. Application Data

(60) Provisional application No. 60/272,845, filed on Mar. 5, 2001.

(51) Int. Cl.$^7$ .................................................. B60Q 1/00
(52) U.S. Cl. ....................... 362/473; 362/500; 362/192; 362/800; 362/544
(58) Field of Search ................................ 362/473, 500, 362/192, 544, 545, 800; 310/67 A

(56) References Cited

U.S. PATENT DOCUMENTS

| | | | |
|---|---|---|---|
| 4,191,988 A | | 3/1980 | Kumakura |
| 4,225,848 A | * | 9/1980 | Roberts ...................... 340/432 |
| 4,796,972 A | | 1/1989 | Thomas et al. |
| 5,333,101 A | | 7/1994 | McEvoy |
| 5,461,269 A | * | 10/1995 | de Raucourt ............. 310/67 A |
| 5,584,561 A | * | 12/1996 | Lahos ......................... 362/72 |
| 5,590,946 A | * | 1/1997 | Jung ........................... 362/72 |
| 6,186,635 B1 | * | 2/2001 | Peterson et al. .............. 362/84 |
| 6,501,199 B2 | * | 12/2002 | Hung ....................... 310/67 A |
| 6,565,242 B2 | * | 5/2003 | Dai ............................ 362/500 |

* cited by examiner

*Primary Examiner*—Sandra O'Shea
*Assistant Examiner*—Anabel Ton
(74) *Attorney, Agent, or Firm*—Matthew J. Peirce

(57) ABSTRACT

A new and improved apparatus which lights up portions of a pair of bicycle tires on a bicycle when the bicycle is in motion is disclosed. The present invention would comprise a generator and two aluminum disks that light up light emitting diodes (LED's) on both tires of a bicycle while the bicycle is being ridden by a user. The aluminum disks would be located in the center of each bicycle tire, while the LED's would be located on two spokes on each tire. On each tire, the spokes that the LED's would be located would be opposite one another, with the spokes being wide enough the entire length of each spoke to accommodate the placement of a plurality of LED's. Each spoke that has LED's attached would have LED's attached to both sides of that particular spoke. The present invention would be configured such that the forward motion of the bicycle would energize the generator, which in turn, would provide energy to the aluminum discs and the LED's. When a user would stop pedaling the bicycle, power from the generator to the aluminum discs and LED's would stop, and in turn, the LED's would cease to emit light.

1 Claim, 2 Drawing Sheets

LIGHTING APPARATUS FOR BICYCLES

This application claims benefit of 60/272,845 filed Mar. 5, 2001.

BACKGROUND OF THE INVENTION

The present invention concerns that of a new and improved apparatus which lights up portions of a pair of bicycle tires on a bicycle when the bicycle is in motion.

DESCRIPTION OF THE PRIOR ART

U.S. Pat. No. 5,333,101, issued to McEvoy, discloses a bicycle safety light which is mounted on the spoke of a bicycle wheel for rotation with the wheel.

U.S. Pat. No. 4,796,972, issued to Thomas et al., discloses a rotary electrical contact assembly which is mounted on the axle of a bicycle wheel.

U.S. Pat. No. 4,191,988, issued to Kumakura, discloses an identification lamp which is mounted on a rotary member which is rotatable on a stationary shaft for rotation about the shaft as the member rotates.

SUMMARY OF THE INVENTION

The present invention concerns that of a new and improved apparatus which lights up portions of a pair of bicycle tires on a bicycle when the bicycle is in motion. The present invention would comprise a generator and two aluminum disks that light up light emitting diodes (LED's) on both tires of a bicycle while the bicycle is being ridden by a user. The aluminum disks would be located in the center of each bicycle tire, while the LED's would be located on two spokes on each tire. On each tire, the spokes that the LED's would be located would be opposite one another, with the spokes being wide enough the entire length of each spoke to accommodate the placement of a plurality of LED's. Each spoke that has LED's attached would have LED's attached to both sides of that particular spoke. The present invention would be configured such that the forward motion of the bicycle would energize the generator, which in turn, would provide energy to the aluminum discs and the LED's. When a user would stop pedaling the bicycle, power from the generator to the aluminum discs and LED's would stop, and in turn, the LED's would cease to emit light.

There has thus been outlined, rather broadly, the more important features of a lighting apparatus for bicycles that the detailed description thereof that follows may be better understood and in order that the present contribution to the art may be better appreciated. There are, of course, additional features of the lighting apparatus for bicycles that will be described hereinafter and which will form the subject matter of the claims appended hereto.

In this respect, before explaining at least one embodiment of the lighting apparatus for bicycles in detail, it is to be understood that the lighting apparatus for bicycles is not limited in its application to the details of construction and to the arrangements of the components set forth in the following description or illustrated in the drawings. The lighting apparatus for bicycles is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present lighting apparatus for bicycles. It is important, therefore, that the claims be regarded as including such equivalent constructions insofar as they do not depart from the spirit and scope of the present invention.

It is therefore an object of the present invention to provide a lighting apparatus for bicycles which has all of the advantages of the prior art and none of the disadvantages.

It is another object of the present invention to provide a lighting apparatus for bicycles which may be easily and efficiently manufactured and marketed.

It is another object of the present invention to provide a lighting apparatus for bicycles which is of durable and reliable construction.

It is yet another object of the present invention to provide a lighting apparatus for bicycles which is economically affordable and available for relevant purchasing government entities.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
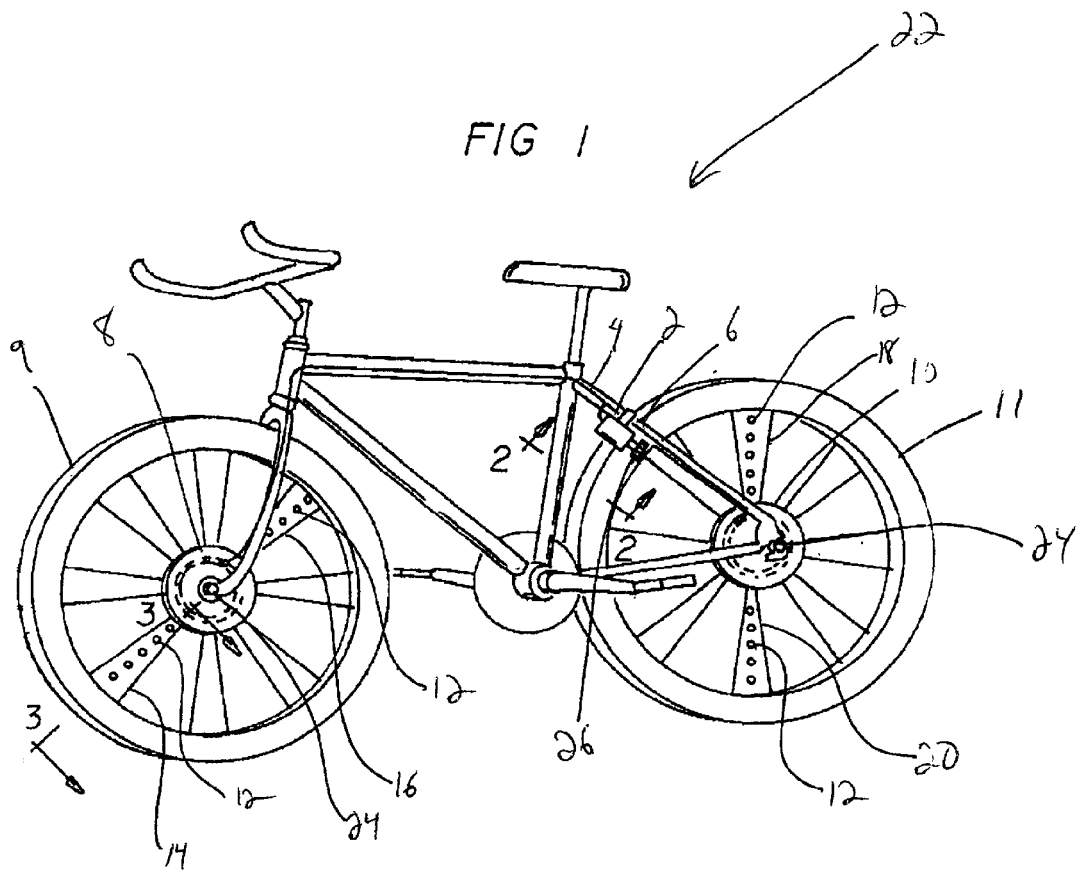
FIG. 1 shows a schematic view of the mechanical configuration of the present invention.

FIG. 1 shows a schematic view of the mechanical configuration of the present invention. As can be seen, generator 2 provides power to front wire 4 and rear wire 6. Front wire 4 provides power to front aluminum disc 8 which is centrally mounted on front tire 9, while rear wire 6 provides power to rear aluminum disc 10 on rear tire 11. Front aluminum disc 8 provides power to a plurality of LED's 12 located on spokes 14 and 16 on front tire 9, while rear aluminum disc 10 provides power to a plurality of LED's 12 located on rear spokes located on spokes 18 and 20 on rear tire 11. Front aluminum disk and rear aluminum disk would be mounted on a central axle 24 that would not rotate when the wheels on a bicycle would be in motion.

Generator 2 only provides power to the present invention when the bicycle is being pedaled by a user. The rotational energy of rear tire 11 is transferred to cam 26, which in turn is connected to generator 2, where the rotational energy is transferred to electrical energy. Each of the aluminum disks would be located in the center of each bicycle tire, while the plurality of LED's 12 would be located on two spokes on each tire. On each tire, the spokes that the plurality of LED's 12 would be located would be opposite one another, with the spokes being wide enough over the entire length of each spoke to accommodate the placement of a plurality of LED's 12. Each spoke that has LED's attached would have LED's attached to both sides of that particular spoke.

The present invention would be configured such that the forward motion of the bicycle would energize generator 2, which in turn, would provide energy to the aluminum discs and the plurality of LED's 12. When a user would stop pedaling bicycle 22, power from generator 2 to the aluminum discs and the plurality of LED's 12 would stop, and in turn, the plurality of LED's 12 would cease to emit light.

Figure 2:
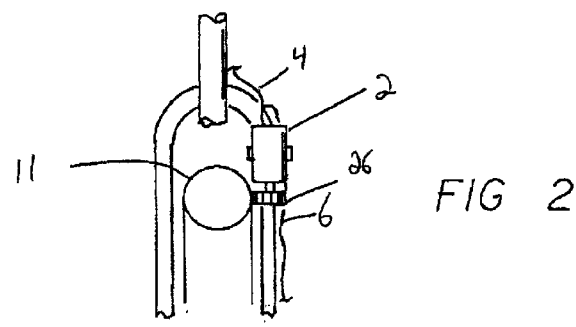
FIG. 2 shows a side view of the generator in contact with the rear tire.

FIG. 2 shows a side view of generator 2 in contact with rear tire 11. Front wire 4 and rear 6 can be seen exiting generator 2, along with cam 26, which is direct contact with rear tire 11. When rear tire 11 is set forth in motion, cam 26 rotates on a central axis, imparting rotational energy into generator 2, where it is converted to electrical energy. The electrical energy then travels along front wire 4 and rear wire 6 to front aluminum disc 8 and rear aluminum disc 10, respectively.

Figure 3:
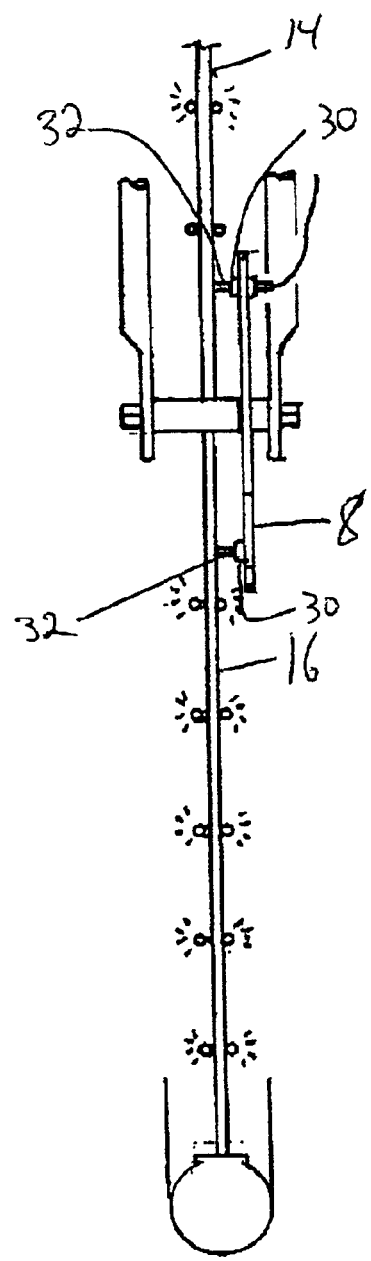
FIG. 3 shows a side view of a pair of spokes and an aluminum disc, along with other associated bicycle parts.

FIG. 3 shows a side view of spokes 14 and 16 and front aluminum disc 8, along with other bicycle parts. Front aluminum disc 8 has two sides, an inner side and an outer side, and has at least a pair of electrical contacts 30 attached to the inner side of front aluminum disc 8. Each of the electrical contacts 30 would be equidistant from a common center and would preferably be placed at equal distances from each other. If only two electrical contacts 30 would be present, they would each be 180 degrees opposite one another.

The plurality of LED's 12 on front tire 9 has an electrical reception contact 32 that comes into contact with each electrical contact 30 at a particular time when front tire 9 would be rotating. In other words, each electrical reception contact 32 is located the same distance from the central axle as each electrical contact 30 is away from the central axle, allowing each electrical reception contact 32 to occasionally and quickly brush against each electrical contact 30 as front tire 9 would rotate in a circular manner. All the LED's 12 on front tire 9 would be connected to the electrical reception contact 32 for that particular spoke, allowing the LED's on a particular spoke to briefly receive electrical energy from electrical contact 30, and thus, briefly light up while front tire 9 would be rotating.

The diagram portrayed in FIG. 3 is a "moment frozen in time" at which each electrical reception contact 32 is in contact with an electrical contact 30. At that particular moment in time, the plurality of LED's 12 would briefly light up. Rear tire 11 and its associated components would have the same configuration as that described in FIG. 3 with respect to front tire 9.

What I claim as my invention is:

1. A bicycle with an incorporated lighting apparatus comprising:
   (a) a bicycle frame,
   (b) a pair of wheels, a front wheel and a rear wheel, the front wheel and the rear wheel attached to the bicycle frame,
   (c) a plurality of spokes attached to each of the wheels; each spoke having two sides, a first side and a second side,
   (d) a pair of bicycle pedals, a left pedal and a right pedal,
   (e) a gear assembly, the gear assembly attached to the bicycle frame, the gear assembly connected to the pair of bicycle pedals, the gear assembly also attached to the rear wheel of the bicycle,
   (f) a bicycle seat attached to the bicycle frame,
   (g) a plurality of lights located on two of the spokes on the front wheel, the two spokes having lights being one hundred eighty degrees from each other, the two spokes each having lights on the first side and the second side of each spoke,
   (h) a plurality of lights located on two of the spokes on the rear wheel, the two spokes having lights being one hundred eighty degrees from each other, the two spokes each having lights oil the first side and the second side of each spoke, and
   (i) power means for providing power to the plurality of lights located on the front wheel and rear wheel, the power means further comprising (i) a generator mounted on the frame, the generator being located underneath the bicycle seat, (ii) a cam rotatably mounted to the generator, the cam being placed so as to be in contact with the rear tire, the cam designed to rotate when the rear tire of the bicycle would be in motion, (iii) a pair of discs; a front disc and a rear disc, the front aluminum disk being mounted on a first central axle, the first central axle located near the attachment of the front tire to the bicycle frame, the first central axle designed to not rotate when the front wheel on a bicycle would be in motion, the rear aluminum disk being mounted on a second central axle, the second central axle located near the attachment of the rear tire to the bicycle frame, the second central axle designed to not rotate when the rear wheel on a bicycle would be in motion, each disc having two sides, an inner side and an outer side, (iv) a pair of wires, a front wire and a rear wire, the front wire having two ends, a first and a second end, the first end of the front wire being connected to the generator, the second end of the front wire being connected to the front disc, the rear wire having two ends, a first and a second end, the first end of the rear wire being connected to the generator, the second end of the rear wire being connected to the rear disc, (v) at least a pair of electrical contacts on the inner side of each disc, all of the electrical contacts located on the inner side of each disc being equidistant from the central axle of that disc, (vi) a first pair of electrical reception contacts, a first electrical reception contact and a second electrical reception contact, each of the electrical reception contacts being located on the inward-facing side of each spoke on the front wheel that would include a plurality of lights, each of the electrical reception contacts being located the same distance from the first central axle as each electrical contact is away from the first central axle, each of the electrical reception contacts being connected to all the lights on that particular bicycle spoke to which the electrical reception contact would be attached, (vii) a second pair of electrical reception contacts, a first electrical reception contact and a second electrical reception contact, each of the electrical reception contacts being located on the inward-facing side of each spoke on the rear wheel that would include a plurality of lights, each of the electrical reception contacts being located the same distance from the second central axle as each electrical contact is away from the second central axle, each of the electrical reception contacts being connected to all the lights on that particular bicycle spoke to which the electrical reception contact would be attached, (viii) wherein rotation of the rear tire would cause the generator to produce power, further wherein the power would be transferred to the front disc and rear disc via the front wire and the rear wire, respectively, and further wherein all the on each bicycle spoke including a plurality of lights would briefly illuminate each time an electrical reception contact at the end of a bicycle spoke on a bicycle tire would come in contact with an electrical contact located on the inner side of a disc.

* * * * *